(12) United States Patent
Mourey et al.

(10) Patent No.: US 8,301,585 B2
(45) Date of Patent: Oct. 30, 2012

(54) VISUALIZATION RECOMMENDATIONS BASED ON MEASURE METADATA

(75) Inventors: Nicolas Mourey, Fleury en Biere (FR); Aurélien Theraud, Clichy (FR)

(73) Assignee: Business Objects Software Limited, Dublin (IE)

( * ) Notice: Subject to any disclaimer, the term of this patent is extended or adjusted under 35 U.S.C. 154(b) by 421 days.

(21) Appl. No.: 12/632,353

(22) Filed: Dec. 7, 2009

(65) Prior Publication Data

US 2011/0137850 A1 Jun. 9, 2011

(51) Int. Cl.
*G06F 7/00* (2006.01)
*G06F 17/00* (2006.01)

(52) U.S. Cl. ........ 707/603; 707/769; 707/776; 715/744; 345/440

(58) Field of Classification Search .......................... None
See application file for complete search history.

(56) References Cited

U.S. PATENT DOCUMENTS

| 7,890,452 | B2 * | 2/2011 | Moore et al. | 707/608 |
| 2008/0005677 | A1 * | 1/2008 | Thompson | 715/744 |
| 2008/0036767 | A1 * | 2/2008 | Janzen | 345/440 |
| 2008/0082908 | A1 | 4/2008 | MacGregor | |
| 2008/0180458 | A1 | 7/2008 | Favart et al. | |
| 2011/0179066 | A1 * | 7/2011 | Cardno et al. | 707/769 |

* cited by examiner

*Primary Examiner* — Michael Hicks
(74) *Attorney, Agent, or Firm* — Buckley, Maschoff & Talwalkar LLC

(57) ABSTRACT

A system includes reception of metadata associated with one or more measures, determination of a compatibility of the two or more measures based on the metadata, and determination of a first score associated with a first visualization based on the compatibility. Some aspects include determination of a second score associated with a second visualization based on the compatibility, comparison of the first score and the second score, and recommendation of one of the first visualization or the second visualization based on the comparison.

21 Claims, 11 Drawing Sheets

500

| Visualization | Base Value | Rule Weight | Feeding Metadata | Measure Compatibility (meta) | | | |
|---|---|---|---|---|---|---|---|
| | | | | Similar Type | | Dissimilar Type | |
| | | | | Aggr. similar | Aggr. dissimilar | Aggr. similar | Aggr. dissimilar |
| Vertical Bar Chart | 24 | 6 | 1D1M | 0 | 0 | 0 | 0 |
| | | | 1D2M | 4 | -4 | -9000 | -9000 |
| | | | 1D3M | 6 | -6 | -9000 | -9000 |
| Horizontal Bar Chart | 22 | 6 | 1D1M | 0 | 0 | 0 | 0 |
| | | | 1D2M | 4 | -4 | -9000 | -9000 |
| | | | 1D3M | 6 | -6 | -9000 | -9000 |
| Dual Bar Chart | 20 | 6 | 1D2M | 3 | 6 | 6 | 10 |
| | | | 1D3M | 3 | 6 | 6 | 12 |
| Radar | 13 | 3 | 1D1M | 0 | 0 | 0 | 0 |
| | | | 1D2M | 5 | -3 | -9000 | -9000 |
| | | | 1D3M | 5 | -6 | -9000 | -9000 |
| Multi-Radar | 10 | 3 | 1D2M | 2 | 3 | 6 | 10 |
| | | | 1D3M | 2 | 3 | 6 | 12 |
| Surface | 14 | 4 | 1D1M | 0 | 0 | 0 | 0 |
| | | | 1D2M | 4 | -4 | -9000 | -9000 |
| | | | 1D3M | 6 | -6 | -9000 | -9000 |
| Tag Cloud | 13 | 2 | 1D1M | 0 | 0 | 0 | 0 |
| | | | 1D2M | 0 | 0 | 8 | 8 |
| Stacked Vertical | 2 | 4 | 1D2M | 10 | -9000 | -9000 | -9000 |
| | | | 1D3M | 12 | -9000 | -9000 | -9000 |
| Stacked Horizontal | 1 | 4 | 1D2M | 10 | -9000 | -9000 | -9000 |
| | | | 1D3M | 12 | -9000 | -9000 | -9000 |
| Pie | 5 | 4 | 1D1M | 0 | 0 | 0 | 0 |
| MultiPie | 4 | 4 | 1D2M | 2 | 2 | 4 | 4 |
| | | | 1D3M | 3 | 3 | 5 | 5 |
| Treemap | 2 | 4 | 1D1M | 0 | 0 | 0 | 0 |
| | | | 1D2M | 0 | 0 | 0 | 0 |
| Scatter | 24 | 0 | 1D2M | --- | --- | --- | --- |
| Bubble | 24 | 0 | 1D3M | --- | --- | --- | --- |
| Line | 24 | 8 | 1D1M | 0 | 0 | 0 | 0 |
| | | | 1D2M | 4 | -4 | -9000 | -9000 |
| | | | 1D3M | 6 | -6 | -9000 | -9000 |
| Dual Line | 23 | 8 | 1D2M | 3 | 6 | 6 | 10 |
| | | | 1D3M | 3 | 6 | 6 | 12 |

*FIG. 5*

| Visualization | Base Value | Rule Weight | Feeding Metadata | Measure Compatibility (meta+data) | | | | | | | |
|---|---|---|---|---|---|---|---|---|---|---|---|
| | | | | Similar Type | | | | Dissimilar Type | | | |
| | | | | Aggr. similar | | Aggr. dissimilar | | Aggr. similar | | Aggr. dissimilar | |
| | | | | Data Rng Similar | Data Rng Dissimilar | Data Rng Similar | Data Rng Dissimilar | Data Rng Similar | Data Rng Dissimilar | Data Rng Similar | Data Rng Dissimilar |
| Vertical Bar Chart | 24 | 8 | 1D1M | 0 | 0 | 0 | 0 | 0 | 0 | 0 | 0 |
| | | | 1D2M | 6 | -6 | 2 | -8 | -9000 | -9000 | -9000 | -9000 |
| | | | 1D3M | 8 | -8 | 2 | -10 | -9000 | -9000 | -9000 | -9000 |
| Horizontal Bar Chart | 22 | 6 | 1D1M | 0 | 0 | 0 | 0 | 0 | 0 | 0 | 0 |
| | | | 1D2M | 6 | -6 | 2 | -8 | -9000 | -9000 | -9000 | -9000 |
| | | | 1D3M | 8 | -8 | 2 | -10 | -9000 | -9000 | -9000 | -9000 |
| Dual Bar Chart | 20 | 6 | 1D2M | 0 | 6 | 0 | 6 | 6 | 6 | 8 | 8 |
| | | | 1D3M | 0 | 6 | 0 | 6 | 6 | 6 | 8 | 8 |
| Radar | 13 | 3 | 1D1M | 0 | 0 | 0 | 0 | 0 | 0 | 0 | 0 |
| | | | 1D2M | 8 | -8 | 2 | -10 | -9000 | -9000 | -9000 | -9000 |
| | | | 1D3M | 10 | -10 | 2 | -12 | -9000 | -9000 | -9000 | -9000 |
| Multi-Radar | 10 | 3 | 1D2M | 0 | 4 | 0 | 4 | 4 | 4 | 4 | 4 |
| | | | 1D3M | 0 | 4 | 0 | 4 | 4 | 4 | 4 | 4 |
| Surface | 14 | 4 | 1D1M | 0 | 0 | 0 | 0 | 0 | 0 | 0 | 0 |
| | | | 1D2M | 6 | -6 | 2 | -8 | -9000 | -9000 | -9000 | -9000 |
| | | | 1D3M | 8 | -8 | 2 | -10 | -9000 | -9000 | -9000 | -9000 |
| Tag Cloud | 13 | 2 | 1D1M | 0 | 0 | 0 | 0 | 0 | 0 | 0 | 0 |
| | | | 1D2M | 0 | 0 | 0 | 0 | 0 | 0 | 0 | 0 |
| Stacked Vertical | 2 | 4 | 1D2M | 12 | 12 | -9000 | -9000 | -9000 | -9000 | -9000 | -9000 |
| | | | 1D3M | 12 | 12 | -9000 | -9000 | -9000 | -9000 | -9000 | -9000 |
| Stacked Horizontal | 1 | 4 | 1D2M | 12 | 12 | -9000 | -9000 | -9000 | -9000 | -9000 | -9000 |
| | | | 1D3M | 12 | 12 | -9000 | -9000 | -9000 | -9000 | -9000 | -9000 |
| Pie | 5 | 4 | 1D1M | 0 | 0 | 0 | 0 | 0 | 0 | 0 | 0 |
| MultiPie | 4 | 4 | 1D2M | 2 | 2 | 2 | 2 | 4 | 4 | 4 | 4 |
| | | | 1D3M | 3 | 3 | 3 | 3 | 5 | 5 | 5 | 5 |
| Treemap | 2 | 4 | 1D1M | 0 | 0 | 0 | 0 | 0 | 0 | 0 | 0 |
| | | | 1D2M | 0 | 0 | 0 | 0 | 0 | 0 | 0 | 0 |

| Visualization | Base Value | Rule Weight | Feeding Metadata | Positivity Min/Max (meta+data) | | | | | |
|---|---|---|---|---|---|---|---|---|---|
| | | | | Bubble | | Treemap | | Others | |
| | | | | Neg. on Size | Mixed on Size | Neg. on Size | Mixed on Size | Data Neg. | Data Mixed |
| Vertical Bar Chart | 24 | 2 | 1D1M | --- | --- | --- | --- | --- | --- |
| | | | 1D2M | --- | --- | --- | --- | --- | --- |
| | | | 1D3M | --- | --- | --- | --- | --- | --- |
| Horizontal Bar Chart | 22 | 2 | 1D1M | --- | --- | --- | --- | --- | --- |
| | | | 1D2M | --- | --- | --- | --- | --- | --- |
| | | | 1D3M | --- | --- | --- | --- | --- | --- |
| Dual Bar Chart | 20 | 3 | 1D2M | --- | --- | --- | --- | --- | --- |
| | | | 1D3M | --- | --- | --- | --- | --- | --- |
| Radar | 13 | 3 | 1D1M | --- | --- | --- | --- | --- | --- |
| | | | 1D2M | --- | --- | --- | --- | --- | --- |
| | | | 1D3M | --- | --- | --- | --- | --- | --- |
| Multi-Radar | 10 | 3 | 1D2M | --- | --- | --- | --- | --- | --- |
| | | | 1D3M | --- | --- | --- | --- | --- | --- |
| Surface | 14 | 5 | 1D1M | --- | --- | --- | --- | --- | --- |
| | | | 1D2M | -9000 | -9000 | --- | --- | --- | --- |
| | | | 1D3M | -9000 | -9000 | --- | --- | --- | --- |
| Tag Cloud | 13 | 5 | 1D1M | --- | --- | --- | --- | --- | --- |
| | | | 1D2M | --- | --- | --- | --- | --- | --- |
| Stacked Vertical | 2 | 4 | 1D2M | -9000 | -9000 | --- | --- | --- | --- |
| | | | 1D3M | -9000 | -9000 | --- | --- | --- | --- |
| Stacked Horizontal | 1 | 4 | 1D2M | -9000 | -9000 | --- | --- | --- | --- |
| | | | 1D3M | -9000 | -9000 | --- | --- | --- | --- |
| Pie | 5 | 4 | 1D1M | -9000 | -9000 | --- | --- | --- | --- |
| MultiPie | 4 | 4 | 1D2M | -9000 | -9000 | --- | --- | --- | --- |
| | | | 1D3M | -9000 | -9000 | --- | --- | --- | --- |
| Treemap | 2 | 5 | 1D1M | xxx | xxx | 0 | 0 | xxx | xxx |
| | | | 1D2M | xxx | xxx | 4 | -5 | xxx | xxx |
| Scatter | 24 | 6 | 1D2M | --- | --- | --- | --- | --- | --- |
| Bubble | 24 | 6 | 1D3M | xxx | xxx | xxx | xxx | -10 | -10 |
| Line | 24 | 0 | 1D1M | --- | --- | --- | --- | --- | --- |
| | | | 1D2M | --- | --- | --- | --- | --- | --- |
| | | | 1D3M | --- | --- | --- | --- | --- | --- |
| Dual Line | 23 | 0 | 1D2M | --- | --- | --- | --- | --- | --- |
| | | | 1D3M | --- | --- | --- | --- | --- | --- |

| Visualization | Base Value | Rule Weight | Feeding Metadata | Positivity (No Data) |
|---|---|---|---|---|
| Vertical Bar Chart | 24 | 2 | 1D1M | --- |
| | | | 1D2M | --- |
| | | | 1D3M | --- |
| Horizontal Bar Chart | 22 | 2 | 1D1M | --- |
| | | | 1D2M | --- |
| | | | 1D3M | --- |
| Dual Bar Chart | 20 | 3 | 1D2M | --- |
| | | | 1D3M | --- |
| Radar | 13 | 3 | 1D1M | --- |
| | | | 1D2M | --- |
| | | | 1D3M | --- |
| Multi-Radar | 10 | 3 | 1D2M | --- |
| | | | 1D3M | --- |
| Surface | 14 | 5 | 1D1M | --- |
| | | | 1D2M | --- |
| | | | 1D3M | --- |
| Tag Cloud | 13 | 5 | 1D1M | --- |
| | | | 1D2M | --- |
| Stacked Horizontal | 2 | 4 | 1D2M | |
| | | | 1D3M | |
| Stacked Vertical | 1 | 4 | 1D2M | |
| | | | 1D3M | |
| Pie | 5 | 4 | 1D1M | |
| MultiPie | 4 | 4 | 1D2M | |
| | | | 1D3M | |
| Treemap | 2 | 5 | 1D1M | -2 |
| | | | 1D2M | --- |
| Scatter | 24 | 6 | 1D2M | 0 |
| Bubble | 24 | 6 | 1D3M | 0 |
| Line | 24 | 0 | 1D1M | --- |
| | | | 1D2M | --- |
| | | | 1D3M | --- |
| Dual Line | 23 | 0 | 1D2M | --- |
| | | | 1D3M | --- |

VISUALIZATION RECOMMENDATIONS BASED ON MEASURE METADATA

BACKGROUND

Business data is typically stored within physical tables of a database. The database may comprise a relational database, such as Oracle, Microsoft SQL Server, IBM DB2, Teradata and the like. The structures and relationships of the physical database tables are complex. To access the stored data, a user with knowledge of the structures and relationships may generate specific database-language queries which are intended to extract desired data from the database.

Business Intelligence (BI) tools typically rely on an abstraction layer that shields end users from the complexity of the physical tables. The abstraction layer allows end users to access business data stored in a database using intuitive terms rather than references to specific physical entities of the database.

Although BI tools and abstraction layers facilitate access to stored data, existing BI tools may fail to present the thusly-accessed data in a meaningful format. More specifically, a user may operate a BI tool to create a table of stored business data. Although the table presents all the data in which the user is interested, the table may fail to effectively convey trends, proportions, and other business information reflected in the data.

Visualizations (e.g., charts, tables, maps) are often used to present data in a manner which assists the understanding thereof. Accordingly, BI tools typically allow a user to create visualizations of accessed business data. Selection of an appropriate visualization for a given set of business data is difficult for the user. If the user selects an inappropriate visualization, the user may fail to appreciate some business meaning in the data that would otherwise be apparent using a different visualization.

Difficulties may arise even if a user is able to reliably select an appropriate visualization for a given set of business data. For example, the user may be unable to correctly perform tasks which are needed to generate the visualization in a most information-conveying manner. These tasks may include associating particular subsets of the data with particular visualization elements (e.g., axes).

Commonly-assigned and co-pending U.S. patent application Ser. Nos. 11/478,836, 11/503,486 and 11/537,586 each relate to systems for facilitating the selection and/or generation of a data visualization. These systems may evaluate different visualizations based in part on the data to be presented thereby.

BRIEF DESCRIPTION OF THE DRAWINGS

FIG. 5 is a tabular representation of information used to evaluate rules associated with visualizations according to some embodiments.

FIG. 6 is a tabular representation of information used to evaluate rules associated with visualizations according to some embodiments.

FIG. 7 is a tabular representation of information used to evaluate rules associated with visualizations according to some embodiments.

FIG. 8 is a tabular representation of information used to evaluate rules associated with visualizations according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1A:
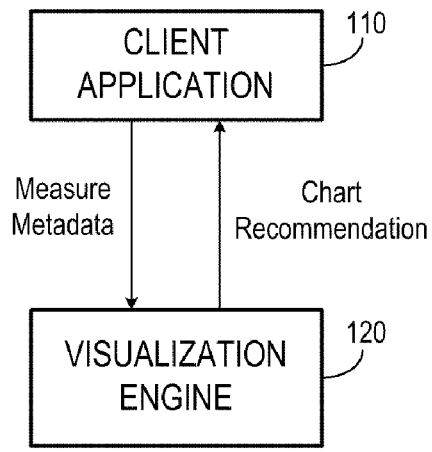
FIG. 1A is a block diagram of a system according to some embodiments.

FIG. 1A is a block diagram including client application 110 and visualization engine 120 according to some embodiments. Client application 110 and visualization engine 120 may comprise any combination(s) of hardware and/or software that are or become known. Client application 110 and visualization engine 120 are intended to provide a brief introduction to some embodiments.

Client application 110 may comprise any application that may require a recommendation of a visualization for presenting data. Client application 110 may comprise, but is not limited to, a BI reporting tool such as SAP BusinessObjects Explorer, SAP BusinessObjects Web Intelligence, and SAP BusinessObjects Voyager.

According to some embodiments, client application 110 may transmit metadata associated with two or more measures to visualization engine 120. Visualization engine 120, in response, provides a recommendation of a visualization to client application 110. As will be described in detail below, visualization engine 120 may determine a score associated with the visualization based on the metadata and may recommend the visualization to client application 110 based on the score. Visualization engine 120 may also generate and provide one or more visualizations (e.g., in a standard graphical file format) to client application 110 according to some embodiments.

Figure 1B:
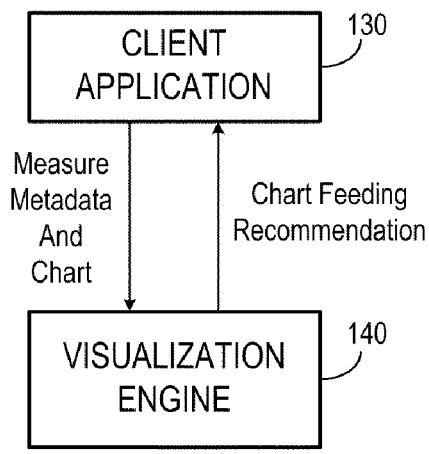
FIG. 1B is a block diagram of a system according to some embodiments.

FIG. 1B is a block diagram including client application 130 and visualization engine 140 according to some embodiments. Client application 130 and visualization engine 140 are also intended to provide a brief introduction to some embodiments, and may comprise any combination(s) of hardware and/or software.

Client application 130 may transmit metadata associated with two or more measures to visualization engine 140. Client application 130 may also transmit an indication of a visualization to visualization engine 140. In return, visualization engine 140 provides a recommendation for dispatching the two or more measures within the visualization (i.e., "feeding" the visualization). Visualization engine 140 may determine scores associated with different feedings of the visualization, and the recommendation may be based on these scores. Visualization engine 140 may also generate and provide the visualization with the recommended feeding to client application 130.

Some embodiments implement the features of FIG. 1A and of FIG. 1B. For example, a visualization engine according to some embodiments may provide a visualization recommendation based on received measure metadata, and may provide a recommendation for feeding a visualization based on received measure metadata and on a selection of the visualization to be fed.

Figure 2:
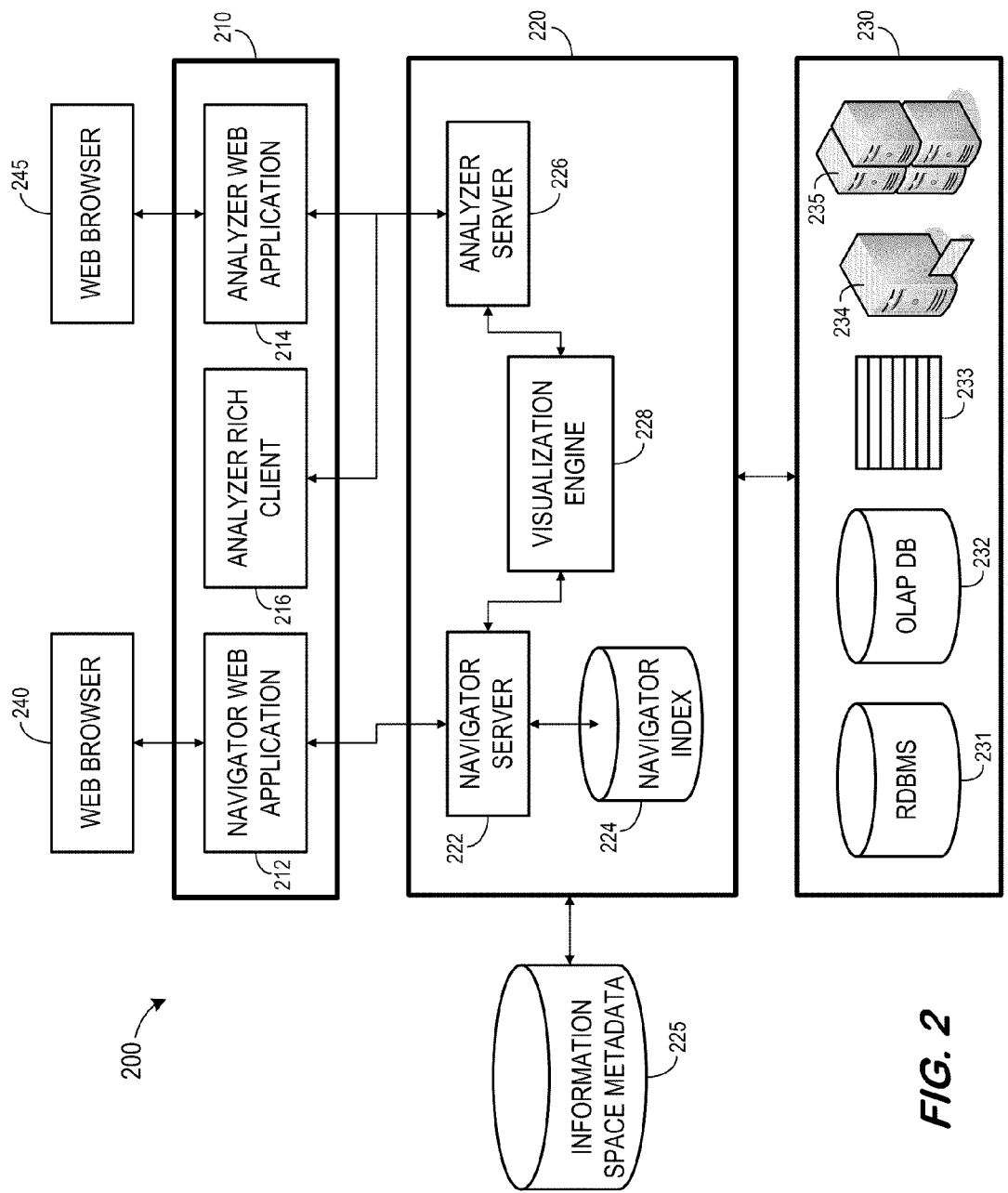
FIG. 2 is a block diagram of a system according to some embodiments

FIG. 2 illustrates system 200 according to some embodiments. System 200 includes BI client layer 210, BI server layer 220 and data layer 230. Generally, client layer 210 uses BI server layer 220 to view data stored in data layer 230. Each layer of system 200 may include elements not illustrated in FIG. 2.

BI server layer 220 (e.g., SAP BusinessObjects Enterprise) provides an abstraction layer which represents the data of data layer 230 as described in the Background. Commonly-assigned and co-pending U.S. patent application Ser. No. 12/463,702 describes such an abstraction layer, referred to therein as a semantic layer. As described, an abstraction layer includes "business objects" representing business entities, such as customers, products, stores, time, sales figures, etc., represented in the data of one or more data sources. Business objects may represent dimensions along which one may want to perform an analysis or report, details which represent additional information on dimensions, and measures which represent indicators, most often numeric, whose values can be determined for a given combination of dimension values. In one example, a Sales measure may be used to determine the total sales for January (i.e., a value of the Month dimension) in France (i.e., a value of the Country dimension).

Information space metadata 225 includes metadata defining the foregoing dimensions, details and measures. Information space metadata 225 may also include other information describing elements of data layer 230. Data layer 230 may comprise one or more of any data sources on which an abstraction layer may be defined, including but not limited to relational database 231, Online Analytical Processing (OLAP) database 232, spreadsheet 233, email repository 234 and application server 235.

Navigator Web application 212, navigator server 222 and navigator index 224 comprise elements of a system to view and navigate data of data layer 230. Navigator server 222 may create index 224 based on metadata of information space metadata 225 and on various aggregations of the data represented therein. Navigator Web application 212 may provide a user interface to Web browser 240, through which a user may request stored data using intuitive terms provided by information space metadata 225. Navigator Web application 212 passes a corresponding request to navigator server 222, which responds to the request by accessing navigator index 224. According to some embodiments, navigator Web application 212, navigator server 222 and navigator index 224 are components of SAP BusinessObjects Explorer.

Analyzer Web application 214 may provide a user interface to Web browser 245 for ad hoc query, reporting and analysis of the data of data layer 230. A user may manipulate the user interface to select measures and dimensions of information space metadata 225, and analyzer server 226 may query data layer 230 to provide data to the user interface based on the selections. Analyzer rich client 216 may comprise a desktop application to provide such a user interface as well as offline analysis capabilities. According to some embodiments, analyzer Web application 214, analyzer rich client 216 and analyzer server 226 are components of SAP BusinessObjects Web Intelligence.

Visualization engine 228 may provide recommendations as described with respect to FIGS. 1A and/or 1B upon request from one or more consuming applications, such as navigator server 222 and analyzer server 226. Visualization engine 228 may expose an interface by which a consuming application may pass metadata and receive a corresponding visualization recommendation (e.g., per FIG. 1A), and/or by which a consuming application may pass metadata and a selected visualization and receive a recommended feeding of the visualization (e.g., per FIG. 1B).

Visualization engine 228 may also provide one or more actual visualizations (e.g., in a graphical file format) to consuming applications. The above-described interface may therefore also allow a consuming application to determine the types of visualizations provided by visualization engine 228, to determine the type of data and feeding required by each visualization, and to request a particular visualization and pass data for populating the visualization. Moreover, visualization engine 228 may implement any functions described in aforementioned U.S. patent application Ser. Nos. 11/478, 836, 11/503,486 and 11/537,586.

Figure 3:
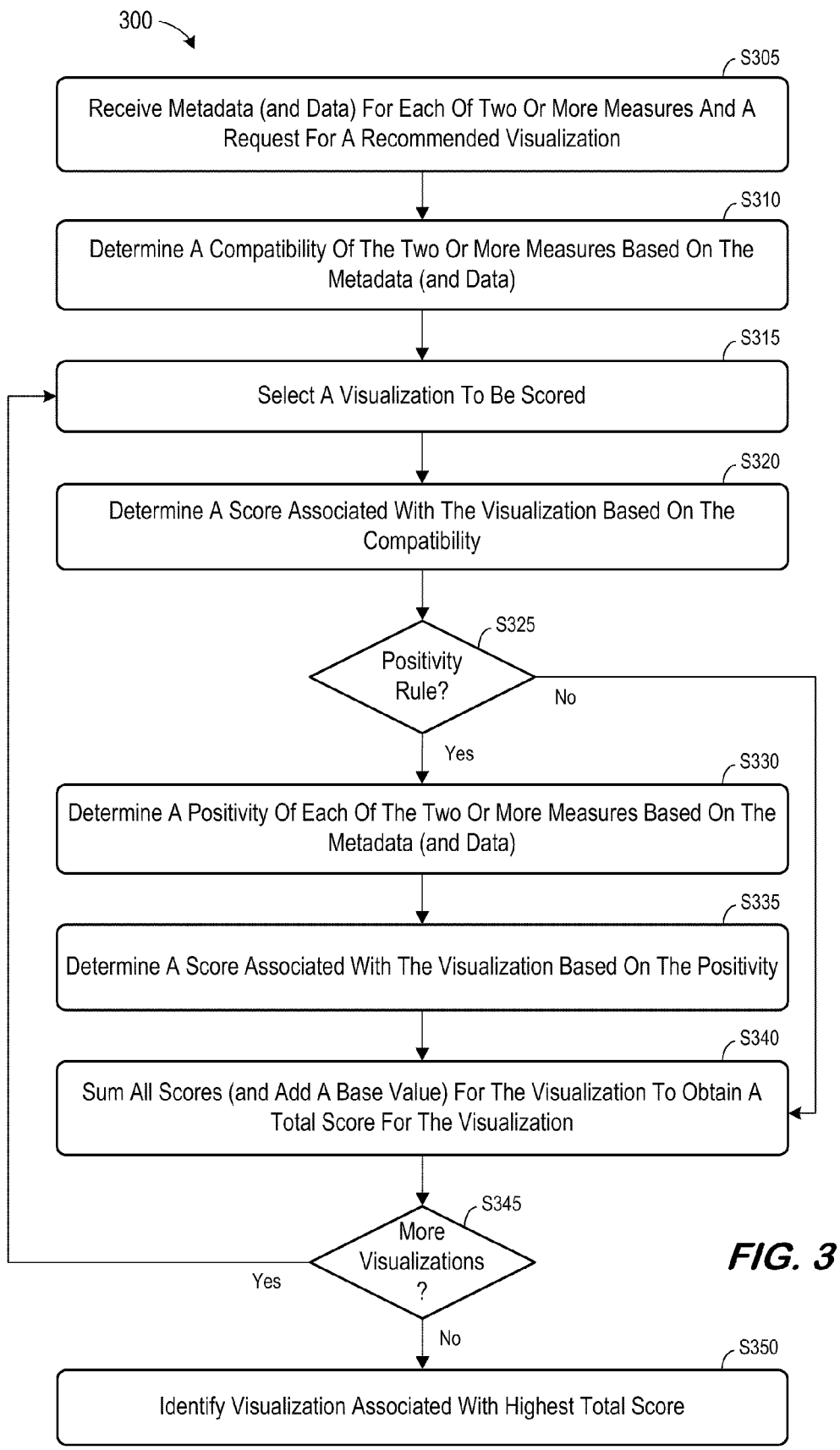
FIG. 3 is a flow diagram of a process according to some embodiments.

FIG. 3 is a flow diagram of process 300 according to some embodiments. Process 300 may be implemented by one or more of visualization engines 110, 130 and 228, but embodiments are not limited thereto. Process 300 may be embodied in computer-executable program code stored on a tangible computer-readable medium, and/or may be implemented by any combination of hardware and/or software.

Initially, at S305, metadata for each of one or more measures is received, along with a request for a recommended visualization. The metadata may describe any one or more characteristics of the one or more measures. For example, the metadata for one of the one or more measures may describe a type (e.g., currency, units), an aggregation (e.g., SUM, AVERAGE, COUNT, etc.), and/or a sign (e.g., positive, negative, mixed) associated with the measure. As will be described below, the sign associated with a measure may also or alternatively be determined from data associated with the measure.

The received metadata may be used as described below to determine a score associated with each of one or more visualizations. Data associated with each of the one or more measures may also be received at S305, and may also be used in the determination of the scores as will be described below.

The scores will be determined in view of a single feeding. For example, it may be assumed that the recommended visualization will be fed according to the order in which the measures were received. Some embodiments of process 300 may determine scores for each possible feeding of each visualization.

Figure 4:
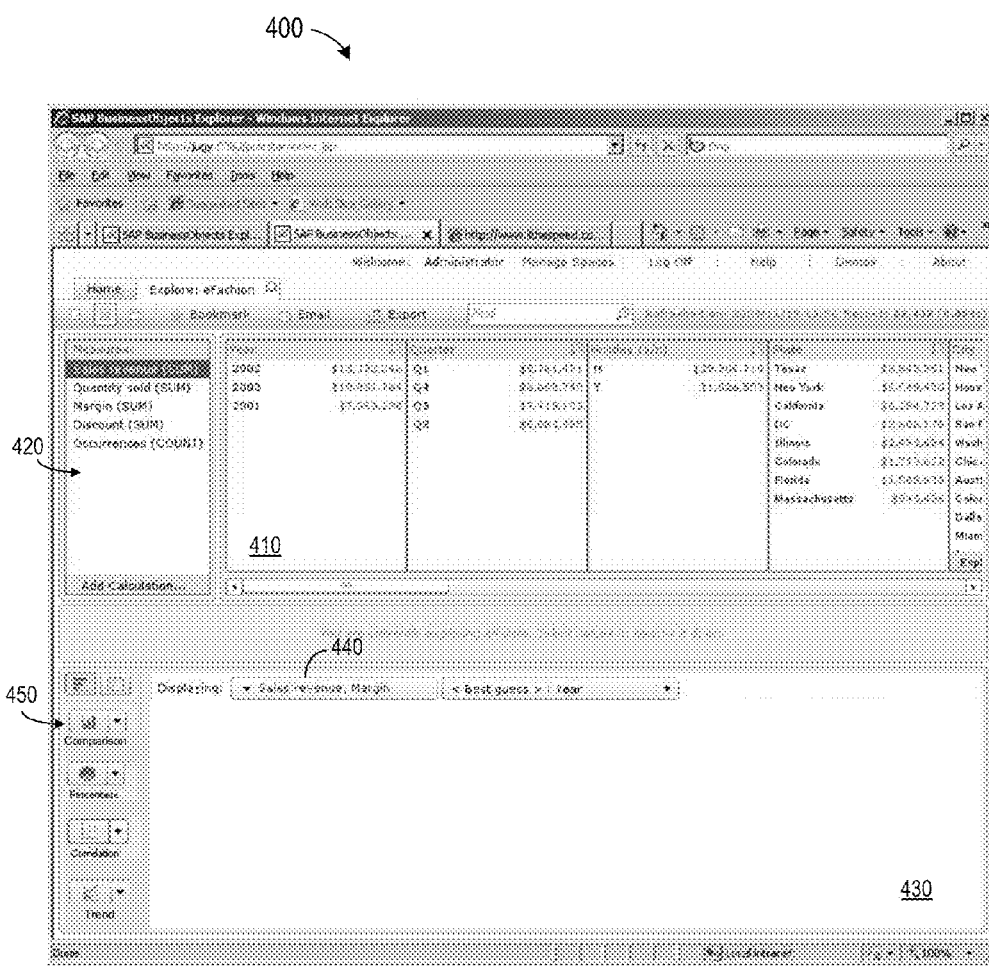
FIG. 4 is an outward view of a user interface of a BI tool according to some embodiments.

FIG. 4 is a view of user interface 400 for explaining S305 according to some embodiments. In some embodiments, a user operates Web browser 240 to access a Web page provided by navigator Web application 212 and associated with a particular information space (e.g., eFashion). In response, navigator server 222 operates in conjunction with navigator index 224 to generate interface 400.

Area 410 of interface 400 displays dimensions (e.g., Year, Store city, Store name) of the information space and their corresponding values (e.g., 2003, 2002, 2001). The particular dimensions which are displayed, and the order in which they are displayed, may be determined by navigator server 222 based on information space metadata 225 and/or navigator index 224. Measure pane 420 displays measures that may be governed by one or more of the displayed dimensions. Since the Sales revenue measure is selected in the measure pane 420, each dimension value of area 410 is displayed in association with a corresponding aggregated value of the Sales revenue measure.

According to the illustrated example, a user uses drop-down tab 440 to select the Sales revenue and Margin measures from measure pane 420. The user also uses pull-down icon 450 to initiate selection of a Comparison-type visualization. In other examples, the user may similarly select a Percentage-type, a Correlation-type or a Trend-type visualization using the other pull-down icons of interface 400 prior to S310.

The foregoing actions cause navigator Web application 212 to transmit indications of the selected measures (i.e., Sales revenue and Margin) and a request for a visualization to navigator server 222. Also transmitted may be indications of one or more of the dimensions selected in area 410. Initially, it will be assumed that an indication of the Year dimension is transmitted along with the other indications and the request.

Navigator server 222 may utilize an interface of visualization engine 228 to transmit the request, metadata associated with the measures, and the dimension to visualization engine 228. According to some embodiments, navigator server 222 retrieves the metadata from information space metadata 225 and/or navigator index 224. Navigator server 222 may receive the metadata from navigator Web application 212.

According to some embodiments, navigator server 222 also passes data associated with the measures and the dimension to visualization engine 228 for reception at S305. Navigator server 222 may receive this data from navigator Web application 212 and/or retrieve the data from data layer 230.

Returning to process 300, a compatibility of the received measures is determined based on their respective metadata. If data associated with the measures was also received at S305, the determination of compatibility may also be based on this data. As will be evident from the foregoing description, determination of the compatibility of the measures based on their metadata may provide a useful basis for evaluating the propriety of a particular visualization for presenting the measures.

Any method for determining compatibility of measures based on their associated metadata (and, optionally, based on associated data) may be employed at S310. According to some embodiments, S310 comprises comparing the types of the measures as described by their associated metadata. The metadata of each measure may specify its type in units (e.g., currency, integer, U.S. Dollars, Euros, percentage), in terms of format (e.g., ##,###.##, ##.###,##, ##%), and/or in any other manner. S310 may therefore comprise determining whether the types of the measures are "similar" or "dissimilar". In this regard, the designation "similar" does not necessarily indicate that the types are identical. Rather, it may be determined that the types U.S. Dollars and Euros are "similar" because both types relate to currency.

S310 may also or alternatively include evaluating the metadata to compare the types of aggregations associated with the measures. The metadata of each measure may specify an aggregation, and S310 may include determining whether the aggregations of the received measures are "similar" or "dissimilar". Again, "similar" does not necessarily mean "identical" in this context. For example, the aggregation SUM may be deemed to be "similar" as the aggregation COUNT because both relate to a summed total.

Moreover, if data associated with each measure was received at S305, S310 may include comparing the ranges of data respectively associated with each measure. In some embodiments, if the range of data associated with one measure is 500 (e.g., from −150 to 350) and the range associated with a second measure is 2500 (e.g., 0 to 2500), it may be determined that the data ranges are dissimilar. On the other hand, ranges of 500 and 700 may be determined to be similar.

Some embodiments may provide finer granularity to describe the results of one or more of the above-described comparisons at S310. For example, compared metadata (and/or data) may be classified as "very similar", "marginally similar", "marginally dissimilar", or "very dissimilar". Moreover, the determination of compatibility may be based on any other alternative or additional metadata that are associated with the measures.

A visualization to be scored is selected at S315. For example, visualization engine 228 may include a library of visualizations. Each visualization in the library may be associated with metadata describing the visualization and executable code for generating the visualization. The metadata associated with a visualization may include information for determining a score associated with the visualization.

Visualizations according to some embodiments may include any type of graphical presentation of data that is or becomes known. Table 500 of FIG. 5 includes a non-exhaustive list of visualizations provided by visualization engine 228 according to some embodiments. Table 500 also compiles information for determining a score associated with each listed visualization. Tables 600 through 800 also include scoring information and will be discussed in the foregoing description of FIG. 3.

In the present example, a visualization is to be fed with data associated with one dimension and two measures. Therefore, the visualization which is initially selected at S310 is a visualization that is deemed to be "compatible" with two measures and one dimension. Notions of compatibility according to some embodiments will be described in detail below. Each of tables 500 through 800 include a Feeding Metadata column to specify the combinations of dimensions/measures (e.g., 1D2M) which are deemed compatible with each type of listed visualization. Continuing with the present example, it will be assumed that the Vertical Bar Chart visualization is initially selected at S320 because table 500 indicates that this visualization is compatible with 1D2M feeding.

According to the present example, the visualization selected at S320 is selected from a pre-defined set of Comparison-type visualizations. Similarly, if Percentage-type visualizations were requested via interface 400, the visualization selected at S320 would be selected from a pre-defined set of Percentage-type visualizations. Embodiments are not limited to such pre-defined sets of visualizations.

A score associated with the selected visualization is determined at S320 based on the determined compatibility. In some embodiments of S320, the score is determined by first identifying a predetermined value associated with the Vertical Bar Chart visualization, the current feeding, and the compatibility. For example, it will be assumed that the compatibility was determined at S310 based only on metadata, and that the measures were determined to be of similar types and similar aggregations. Accordingly, with reference to the second row of table 500, the value "4" is identified. In contrast, the value "−4" would be identified if the types of the measures were determined to be similar and the aggregations were determined to be dissimilar.

The predetermined value may be identified from table 600 in a case that the ranges of associated measure data were also compared at S310. As shown, the row associated with the "1D2M" feeding includes eight values based on eight different possible compatibility determinations. The identified value is "6" if the types and aggregations of the measures were determined to be similar and the data ranges of the measures were also determined to be similar. If the types were determined to be dissimilar, a value of −9000 is identified, regardless of the similarities of the aggregations and the data ranges.

The value −9000 is intended to eliminate the thus-scored visualization from consideration. Any other suitable value or flag to eliminate an incompatible visualization may be employed.

Embodiments are not to be deemed limited to the possible compatibility determinations reflected in tables 500 and 600. Moreover, the values indicated for each combination of visualization, feeding and compatibility are not limited to those illustrated. Embodiments are also not limited to the feedings represented in tables 500 and 600. That is, a visualization may be fed with data associated with more than three measures, and/or with respect to more than one dimension.

In some embodiments, the value identified as described above is multiplied by an associated rule weight as shown in tables 500 and 600. In the present example (i.e., Vertical Bar Chart visualization and 1D2M feeding), if the compatibility was determined based only on metadata and the measures were determined to be of similar types and similar aggregations, the identified value (i.e., "4") is multiplied by the rule weight "6" to determine the score at S320. For the same visualization and feeding, if the compatibility was determined based on metadata and data, the measures were determined to be of similar types and similar aggregations, and the ranges of associated data were determined to be similar, table 600 indicates that the identified value (i.e., "6") should be multiplied by rule weight "8".

Next, at S325, it is determined whether a positivity rule is associated with the selected visualization and the present feeding. Tables 700 and 800 illustrate information for positivity rules associated with various visualizations. More specifically, table 700 includes information for cases in which measure metadata and measure data are available, while table 800 includes information for cases in which measure data is not available.

Since no information is associated with the Vertical Bar Chart visualization in tables 700 or 800, flow continues to S340. A total score for the visualization is obtained by summing all scores obtained for the visualization. Assuming that a weighted score of "24" was determined at S320 and that no applicable positivity rule was identified, the total score is also "24". In some embodiments, a base value is added to the sum at S340. This base value may reflect user preferences, historical preferences, or any other influence. Continuing with the present example, a base value of "24" for the Vertical Bar Chart is identified in table 500 and the total score obtained at S340 is 24+24=48.

Next, at S345, it is determined whether any other visualizations remain to be scored. For example, S345 may comprise determining whether total scores have been determined for all visualizations which are compatible with the present feeding. The candidate visualizations which are considered at S345 may be those of a pre-selected type (e.g., Comparison-type) or category. If other visualizations remain to be scored, flow returns to S315 and continues as described above.

It will now be assumed that a Treemap visualization is selected at S315. As shown in tables 500 and 600, a score of "0" is determined for this visualization at S320 regardless of the determined compatibility or weighting. Flow continues from S325 to S330 because table 700 includes information for a positivity rule associated with the Treemap visualization.

A positivity of each the subject two or more measures is determined at S330. In some embodiments, the positivity of a measure is positive if the minimum value of the measure's associated data is greater than or equal to zero. Conversely, the positivity of a measure is negative if the maximum value of the measure's associated data is less than or equal to zero. In any other case, the positivity is mixed.

A score associated with the visualization is then determined at S335 based on the positivity. Table 700 shows scores based on the "Size" axis of the Treemap visualization. In this regard, one of the received measures (e.g., the first-listed measure) is associated with the Size axis. If the positivity of this measure is mixed, the determined score is "−5". This score reflects the difficultly in using the size of a graphic to represent mixed positive and negative values. The score may be multiplied by a weight (i.e., "5") as described above.

The differences between scoring a Treemap visualization and a Vertical Bar Chart visualization may reflect pre-defined categories to which these visualizations belong. In some embodiments, visualizations may be assigned to one or more categories, and the particular scoring algorithm used to determine a score for a visualization may be based on the category to which the visualization belongs.

For example, a first category may include visualizations in which all measures are drawn on a same Cartesian Axis and have a common abscise. Such visualizations may include a Vertical/Horizontal Bar chary, Line chart, and a Radar chart with one color per measure. A second category may include visualizations in which all measures are dispatched on two ordonates to represent a group of analysis (e.g., Dual Bar chart and Dual Line chart). Visualizations in which a measure is represented by an area may constitute a third category, including Treemap visualizations, Text Cloud visualizations (i.e., with one measure), Pie visualizations, Donut visualizations, and Three-dimensional Pie visualizations.

Measure-based coloring visualizations include Heatmap, Treemap visualizations, Tag/Text Cloud visualizations and Geomap visualizations. Yet another category may consist of visualizations for presenting compatible measures associated with incompatible data ranges. Visualizations of this latter category include Stacked Bar visualizations. Embodiments are not limited to the foregoing categories or visualization/category associations.

Flow then continues to S340 and continues as described above. If it is subsequently determined at S345 that scores have been determined for all visualizations compatible with the present feeding, a visualization associated with a highest score is identified at S350.

Figure 9:
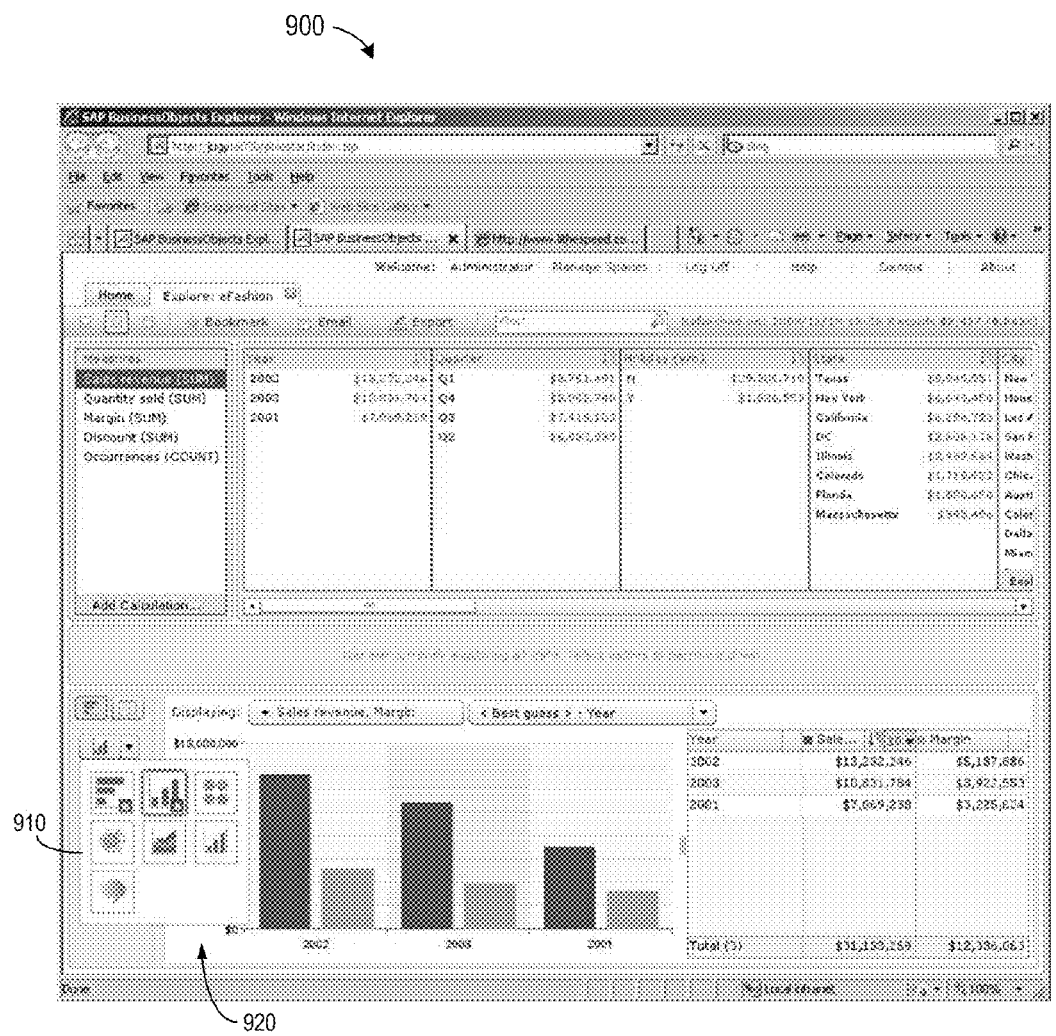
FIG. 9 is an outward view of a user interface of a BI tool according to some embodiments.

According to some embodiments of S350, visualization engine 228 transmits an indication of the visualization associated with the highest score to navigator server 222. Navigator server 222 and navigator Web application 212 may then operate to transmit an interface indicating the visualization to Web browser 240. Continuing the example of FIG. 4, interface 900 of FIG. 9 may be presented to the user at S350.

Interface 900 shows recommendation window 910, which includes indications of visualizations which have been recommended by visualization engine 228 based on the metadata of the specified measures as described above. A user may select one of the visualizations presented in recommendation window 910 and, in response, the selected visualization may be displayed in visualization pane 920.

Some embodiments may present a particular number of highest-scoring visualizations to the user. Some embodiments may present all visualizations which are associated with scores above a certain threshold. Recommendation window 910 may illustrate the seven highest-scoring visualizations, with those exceeding a certain threshold score being indicated with star icons.

Figure 10:
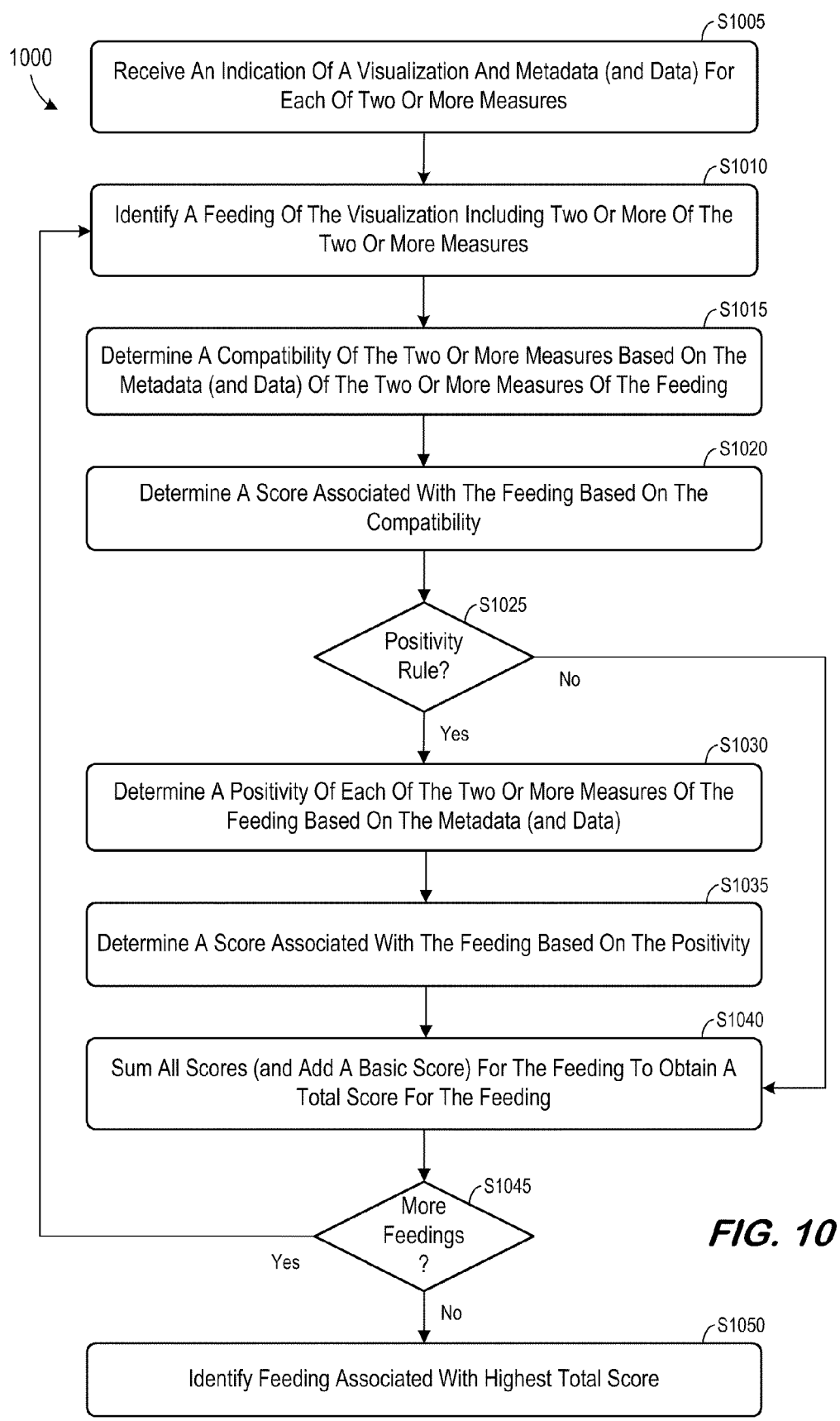
FIG. 10 is a flow diagram of a process according to some embodiments.

FIG. 10 is a flow diagram of process 1000 according to some embodiments. Process 1000 may be implemented by one or more of visualization engines 110, 130 and 228, but embodiments are not limited thereto. Process 1000 may be embodied in computer-executable program code stored on a tangible computer-readable medium, and/or may be implemented by any combination of hardware and/or software.

Process 1000 may implement the system described with respect to FIG. 1B of the present application. More specifically, visualization engine 228 may execute process 1000 to provide a recommendation for dispatching one or more specified measures within a specified visualization.

An indication of a visualization and metadata of two or more measures are received at S1005. Data associated with the two or more measures may also be received at S1005 according to some embodiments. Visualization engine 228 may receive the metadata and data at S1005 as described above with respect to S305. Moreover, the received indication may indicate a visualization specified by a user of interface 400 or a default visualization.

Figure 11:
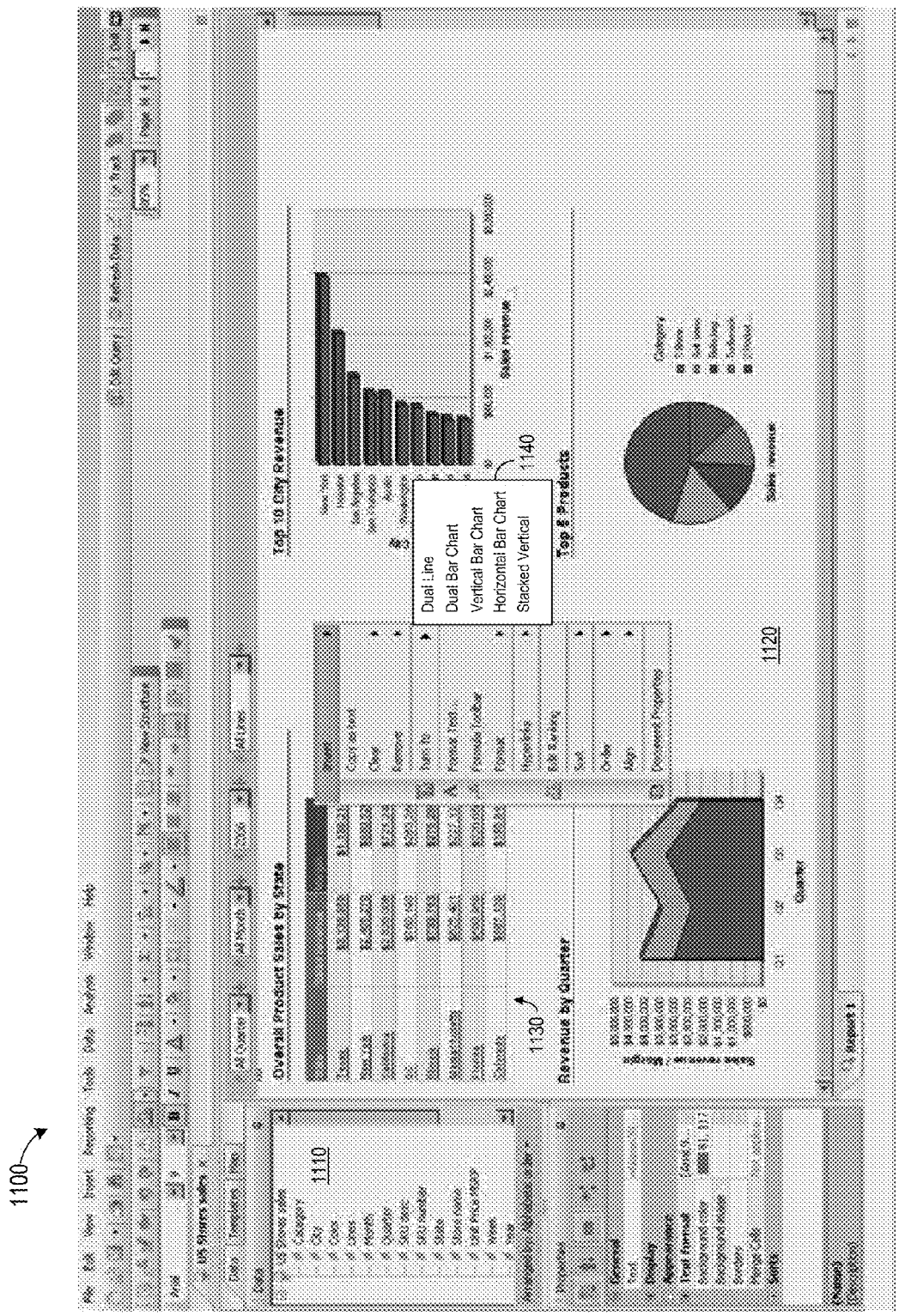
FIG. 11 is an outward view of a user interface of a BI tool according to some embodiments.

According to some embodiments, analyzer server 226 and analyzer Web application 210 operate to provide interface 1100 of FIG. 11 to Web browser 245. A user then manipulates interface 1100 to specify two or more measures and to select a visualization, and the measures and visualization are passed to visualization engine 228. In more detail, a user may drag dimensions and measures from panel 1110 to pane 1120 to create table 1130. The user then accesses context menu 1140 by right-clicking on table 1130 and selects a visualization therefrom. Embodiments are not limited to the foregoing example.

A feeding of the visualization is identified at S 1010. The feeding includes two or more of the two or more measures. The feeding may comprise any feeding that is compatible with the selected visualization. In this regard, a visualization may be compatible with several types of feedings (e.g., 1D1M, 1D2M, 1D3M, 2D2M, etc.), and any of the received measure may be selected to feed any axis of each feeding.

Next, at S1015, a compatibility of the two or more measures of the feeding is determined based on the metadata thereof. Determination of the compatibility may proceed as described above with respect to S310.

Both S320 and S1020 begin with a selected visualization, a determination of the compatibility of two or more measures, a specific feeding of the visualization with the two or more measures and, optionally, data associated with the specific measures. S1020 through S1040 therefore proceed as described above with respect to S320 through S340 of process 300 to determine a score based on the compatibility, to determine a positivity and a score based on the positivity, if a positivity rule applies, and to obtain a total score based on all scores determined for the feeding.

At S1045, it is determined whether any other feedings of the visualization are possible. In other words, S1045 may comprise determining if a total score has been determined for each possible feeding of the visualization in view of the two or more measures received at S1005. If not, flow returns to S1010 and proceeds as described above to determine a total score for a next feeding of the selected visualization.

Flow continues from S1045 to S1050 if total scores have been determined for all possible feedings. A feeding associated with a highest total score is identified at S1050.

According to some embodiments of S350, visualization engine 228 generates the selected visualization according to the identified feeding, and analyzer server 226 is presents the generated visualization to the user.

More than one feeding may be identified at S1050, including a particular number of highest-scoring feedings, and/or all feedings which are associated with scores above a certain threshold. If only one feeding is associated with a score above a minimum threshold, the selected visualization may be automatically presented to the user according to the one feeding.

As described with respect to FIGS. 1A and 1B, process 300 and process 1000 may be combined to compute scores for all possible feedings of all visualizations based on two or more selected measures. Such a combination may allow visualization engine 228 to provide a better recommendation than would be provided by either of process 300 or process 1000 independently, at a cost of additional processing overhead.

Embodiments described herein are solely for the purpose of illustration. Those in the art will recognize other embodiments may be practiced with modifications and alterations to that described above.

What is claimed is:

1. A method comprising:
   receiving, by a computer, metadata associated with two or more measures;
   determining, by the computer, a plurality of feedings based on the two or more measures, each of the plurality of feedings including a respective subset of the two or more measures;
   for each one of the plurality of feedings, determining, by the computer: (i) a compatibility of the subset of the two or more measures included in the one of the plurality of feedings, (ii) a first score associated with a first type of visualization based on the compatibility of the subset of the two or more measures included in the one of the plurality of feedings and (iii) a second score associated with a second type of visualization based on the compatibility of the subset of the two or more measures included in the one of the plurality of feedings; and
   determining, by the computer, a recommendation that is based on the first score for each of the plurality of feedings and the second score for each of the plurality of feedings;
   wherein the determining the first score associated with the first type of visualization based on the compatibility of the subset of the two or more measures included in the one of the plurality of feedings comprises:
      identifying a first value that is associated with the first type of visualization, the determined compatibility of the subset of the two or more measures included in the one of the plurality of feedings and a total number of measures in the subset of the two or more measures included in the one of the plurality of feedings; and
      determining the first score associated with the first type of visualization based on the first value; and
   wherein the determining the second score associated with the second type of visualization based on the compatibility of the subset of the two or more measures included in the one of the plurality of feedings comprises:
      identifying a second value that is associated with the second type of visualization, the determined compatibility of the subset of the two or more measures included in the one of the plurality of feedings and a total number of measures in the subset of the two or more measures included in the one of the plurality of feedings; and
      determining the second score associated with the second type of visualization based on the second value.

2. A method according to claim 1, wherein the recommendation comprises:

one of the plurality of feedings; and
one of the first type of visualization or the type of second visualization.

3. A method according to claim 2, wherein the determining the compatibility of the subset of the two or more measures included in the one of the plurality of feedings comprises determining the compatibility of the subset of the two or more measures included in the one of the plurality of feedings based on the metadata and based on data respectively associated with each measure included in the subset of the two or more measures.

4. A method according to claim 3, wherein the determining the compatibility of the subset of the two or more measures included in the one of the plurality of feedings comprises determining the compatibility of the subset of the two or more measures included in the one of the plurality of feedings based on an aggregation type associated with each measure included in the subset of the two or more measures and based on a range of the data respectively associated with each measure included in the subset of the two or more measures.

5. A method according to claim 1, wherein the determining the compatibility of the subset of the two or more measures included in the one of the plurality of feedings comprises determining the compatibility of the subset of the two or more measures included in the one of the plurality of feedings based on the metadata and based on data respectively associated with each measure included in the subset of the two or more measures.

6. A method according to claim 5, wherein the determining the first score associated with the first type of visualization based on the first value comprises:
    determining a first intermediate score associated with the first type of visualization based on the first value;
    determining a positivity of each measure included in the subset of the two or more measures based on the data respectively associated with each measure included in the subset of the two or more measures;
    determining a second intermediate score associated with the first type of visualization based on the positivity of each measure included in the subset of the two or more measures; and
    determining the first score based on the first intermediate score and on the second intermediate score.

7. A method according to claim 5, wherein the determining the compatibility of the subset of the two or more measures included in the one of the plurality of feedings comprises determining the compatibility of the subset of the two or more measures included in the one of the plurality of feedings based on an aggregation type associated with each measure included in the subset of the two or more measures and based on a range of the data respectively associated with each measure included in the subset of the two or more measures.

8. A method according to claim 1, wherein the determining the first score associated with the first type of visualization based on the first value comprises:
    determining a first intermediate score associated with the first type of visualization based on the first value;
    determining a positivity of each measure included in the subset of the two or more measures based on the data respectively associated with each measure included in the subset of the two or more measures;
    determining a second intermediate score associated with the first type of visualization based on the positivity of each measure included in the subset of the two or more measures; and
    determining the first score based on the first intermediate score and on the second intermediate score.

9. A method according to claim 8, wherein the determining the second score associated with the second type of visualization based on the second value comprises:
    determining a third intermediate score associated with the second type of visualization based on the second value;
    determining a positivity of each measure included in the subset of the two or more measures based on the data respectively associated with each measure included in the subset of the two or more measures;
    determining a fourth intermediate score associated with the second type of visualization based on the positivity of each measure included in the subset of the two or more measures; and
    determining, a second score associated with the second visualization based on the third intermediate score and on the fourth intermediate score.

10. A method according to claim 9,
wherein the determining the compatibility of the subset of the two or more measures included in the one of the plurality of feedings comprises determining the compatibility of the subset of the two or more measures included in the one of the plurality of feedings based on an aggregation type associated with each measure included in the subset of the two or more measures and based on a range of the data respectively associated with each measure included in the subset of the two or more measures.

11. A system comprising:
a client application to transmit metadata associated with two or more measures; and
a visualization engine that includes a computer, the visualization engine to:
    receive the metadata;
    determine a plurality of feedings based on the two or more measures, each of the plurality of feedings including a respective subset of the two or more measures;
    for each one of the plurality of feedings, determine: (i) a compatibility of the subset of the two or more measures included in the one of the plurality of feedings, (ii) a first score associated with a first type of visualization based on the compatibility of the subset of the two or more measures included in the one of the plurality of feedings and (iii) a second score associated with a second type of visualization based on the compatibility of the subset of the two or more measures included in the one of the plurality of feedings; and
    determine a recommendation that is based on the first score for each of the plurality of feedings and the second score for each of the plurality of feedings;
    wherein the determine the first score associated with the first type of visualization based on the compatibility of the subset of the two or more measures included in the one of the plurality of feedings comprises:
        identify a first value that is associated with the first type of visualization, the determined compatibility of the subset of the two or more measures included in the one of the plurality of feedings and a total number of measures in the subset of the two or more measures included in the one of the plurality of feedings; and
        determine the first score associated with the first type of visualization based on the first value; and
    wherein the determine the second score associated with the second type of visualization based on the compatibility of the subset of the two or more measures included in the one of the plurality of feedings comprises:
identify a second value that is associated with the second type of visualization, the determined compatibility of the subset of the two or more measures included in the one of the plurality of feedings and a total number of measures in the subset of the two or more measures included in the one of the plurality of feedings; and
determine the second score associated with the second type of visualization based on the second value.

12. A system according to claim 11, wherein the recommendation comprises:
one of the plurality of feedings; and
one of the first type of visualization or the type of second visualization.

13. A system according to claim 12, wherein the determine the compatibility of the subset of the two or more measures included in the one of the plurality of feedings comprises determine the compatibility of the subset of the two or more measures included in the one of the plurality of feedings based on the metadata and based on data respectively associated with each measure included in the subset of the two or more measures.

14. A system according to claim 13, wherein the determine the compatibility of the subset of the two or more measures included in the one of the plurality of feedings comprises determine the compatibility of the subset of the two or more measures included in the one of the plurality of feedings based on an aggregation type associated with each measure included in the subset of the two or more measures and based on a range of the data respectively associated with each measure included in the subset of the two or more measures.

15. A system according to claim 11, wherein the determine the compatibility of the subset of the two or more measures included in the one of the plurality of feedings comprises determine the compatibility of the subset of the two or more measures included in the one of the plurality of feedings based on the metadata and based on data respectively associated with each measure included in the subset of the two or more measures.

16. A system according to claim 15, wherein the determination of the first score associated with the first type of visualization based on the first value comprises:
determination of a first intermediate score associated with the first type of visualization based on the first value;
determination of a positivity of each measure included in the subset of the two or more measures based on the data respectively associated with each measure included in the subset of the two or more measures;
determination of a second intermediate score associated with the first type of visualization based on the positivity of each measure included in the subset of the two or more measures; and
determination of the first score based on the first intermediate score and on the second intermediate score.

17. A system according to claim 15, wherein the determination of the compatibility of the subset of the two or more measures included in the one of the plurality of feedings comprises determination of the compatibility of the subset of the two or more measures included in the one of the plurality of feedings based on an aggregation type associated with each measure included in the subset of the two or more measures and based on a range of the data respectively associated with each measure included in the subset of the two or more measures.

18. A system according to claim 11, wherein the determination of the first score associated with the first type of visualization based on the first value comprises:
determination of a first intermediate score associated with the first type of visualization based on the first value;
determination of a positivity of each measure included in the subset of the two or more measures based on the data respectively associated with each measure included in the subset of the two or more measures;
determination of a second intermediate score associated with the first type of visualization based on the positivity of each measure included in the subset of the two or more measures; and
determination of the first score based on the first intermediate score and on the second intermediate score.

19. A system according to claim 18, wherein the determination of the second score associated with the second type of visualization based on the second value comprises:
determination of a third intermediate score associated with the second type of visualization based on the second value;
determination of a positivity of each measure included in the subset of the two or more measures based on the data respectively associated with each measure included in the subset of the two or more measures;
determination of a fourth intermediate score associated with the second type of visualization based on the positivity of each measure included in the subset of the two or more measures; and
determination of a second score associated with the second visualization based on the third intermediate score and on the fourth intermediate score.

20. A system according to claim 19,
wherein the determination of the compatibility of the subset of the two or more measures included in the one of the plurality of feedings comprises determination of the compatibility of the subset of the two or more measures included in the one of the plurality of feedings based on an aggregation type associated with each measure included in the subset of the two or more measures and based on a range of the data respectively associated with each measure included in the subset of the two or more measures.

21. A non-transitory computer-readable medium having stored thereon program code, the program code executable by a computer to result in a method comprising:
receiving metadata associated with two or more measures;
determining a plurality of feedings based on the two or more measures, each of the plurality of feedings including a respective subset of the two or more measures;
for each one of the plurality of feedings, determining: (i) a compatibility of the subset of the two or more measures included in the one of the plurality of feedings, (ii) a first score associated with a first type of visualization based on the compatibility of the subset of the two or more measures included in the one of the plurality of feedings and (iii) a second score associated with a second type of visualization based on the compatibility of the subset of the two or more measures included in the one of the plurality of feedings; and
determining a recommendation that is based on the first score for each of the plurality of feedings and the second score for each of the plurality of feedings;

wherein the determining the first score associated with the first type of visualization based on the compatibility of the subset of the two or more measures included in the one of the plurality of feedings comprises:
identifying a first value that is associated with the first type of visualization, the determined compatibility of the subset of the two or more measures included in the one of the plurality of feedings and a total number of measures in the subset of the two or more measures included in the one of the plurality of feedings; and
determining the first score associated with the first type of visualization based on the first value; and
wherein the determining the second score associated with the second type of visualization based on the compatibility of the subset of the two or more measures included in the one of the plurality of feedings comprises:
identifying a second value that is associated with the second type of visualization, the determined compatibility of the subset of the two or more measures included in the one of the plurality of feedings and a total number of measures in the subset of the two or more measures included in the one of the plurality of feedings; and
determining the second score associated with the second type of visualization based on the second value.

* * * * *